(12) United States Patent
Dufty

(10) Patent No.: US 9,918,421 B2
(45) Date of Patent: Mar. 20, 2018

(54) SPIKER ROLLER

(71) Applicant: TRU-TURF Pty Ltd, Arundel, Queensland (AU)

(72) Inventor: Raymond Jeffrey Dufty, Arundel (AU)

(73) Assignee: TRU-TURF PTY LTD., Arundell (AU)

( * ) Notice: Subject to any disclaimer, the term of this patent is extended or adjusted under 35 U.S.C. 154(b) by 1 day.

(21) Appl. No.: 14/383,834

(22) PCT Filed: Mar. 18, 2013

(86) PCT No.: PCT/AU2013/000270
§ 371 (c)(1),
(2) Date: Sep. 8, 2014

(87) PCT Pub. No.: WO2013/138848
PCT Pub. Date: Sep. 26, 2013

(65) Prior Publication Data
US 2015/0075825 A1    Mar. 19, 2015

(30) Foreign Application Priority Data
Mar. 19, 2012    (AU) .................................. 2012901105

(51) Int. Cl.
*A01B 45/02*    (2006.01)
*A01B 29/04*    (2006.01)

(52) U.S. Cl.
CPC .............. *A01B 45/02* (2013.01); *A01B 29/04* (2013.01)

(58) Field of Classification Search
CPC ......... A01B 45/02; A01B 45/023; A01B 1/24; A01B 1/243; A01B 35/28; A01B 39/08; A01B 39/163; A01B 39/19
See application file for complete search history.

(56) References Cited

U.S. PATENT DOCUMENTS

| 872,562 | A | * | 12/1907 | Hibler | .......................... 172/553 |
| 1,718,823 | A | * | 6/1929 | Jeppson | .............. A01B 29/045 |
| | | | | | 172/551 |
| 1,887,334 | A | * | 11/1932 | Spaeth | .................... A01B 1/24 |
| | | | | | 111/11 |

(Continued)

FOREIGN PATENT DOCUMENTS

JP    2006006159    1/2006

OTHER PUBLICATIONS

Sarel Spikes [retrieved from Internet] <URL: http:www.pitchcare.com/shop/aerators/sarel-spiking-roller-accessories.html> Whole Document.

(Continued)

*Primary Examiner* — Robert E Pezzuto
*Assistant Examiner* — Jessica H Lutz
(74) *Attorney, Agent, or Firm* — Kirton McConkie; Evan R. Witt

(57) ABSTRACT

A spiker roller having (i) a roller assembly having a plurality of roller components each having a peripheral wall and a plurality of apertures in each wall and a centrally located hub or boss surrounding an opening; (ii) a multiplicity of spikes which are each releasably retained within a respective aperture of each roller component; and (iii) a support shaft which is insertable through each of the openings of each roller component wherein in operation each of the roller components rotate independently of each other.

7 Claims, 4 Drawing Sheets

(56) References Cited

U.S. PATENT DOCUMENTS

| | | | | |
|---|---|---|---|---|
| 2,229,497 A * | 1/1941 | Dontje | ............... | A01B 45/02 172/104 |
| 2,314,035 A * | 3/1943 | Dontje | ............... | A01B 45/02 172/103 |
| 3,451,488 A * | 6/1969 | Taketa | ............... | A01B 29/06 171/53 |
| 3,643,746 A * | 2/1972 | Dedoes | ............ | A01B 29/045 172/21 |
| 3,650,331 A * | 3/1972 | Dedoes | ............ | A01B 29/045 172/21 |
| 3,650,332 A * | 3/1972 | Dedoes | ............ | A01B 29/045 172/22 |
| 4,768,596 A * | 9/1988 | Riski | ............... | A01B 39/08 172/545 |
| 5,029,652 A * | 7/1991 | Whitfield | ............ | A01B 45/02 172/1 |
| 5,101,910 A | 4/1992 | Dawson | | |
| 5,398,769 A * | 3/1995 | Staples | ............... | A01B 45/02 172/21 |
| 5,803,181 A * | 9/1998 | Hsu | ............... | A01B 1/243 172/21 |
| 6,631,770 B2 * | 10/2003 | Guard | ............... | A01B 1/243 172/21 |
| 7,475,527 B2 * | 1/2009 | Kucharski | ............ | A01D 44/00 56/8 |
| 8,714,278 B2 * | 5/2014 | Wright | ............... | A01B 29/043 172/519 |
| 2002/0074137 A1 * | 6/2002 | Dillon | ............... | A01B 45/02 172/21 |

OTHER PUBLICATIONS

Sarel Spikes [retrieved from Internet] <URL: http:pdfs.findtheneedle.co.uk/117848-4267.pdf> Catalog dated Sep. 9, 2010 Whole Document.

* cited by examiner

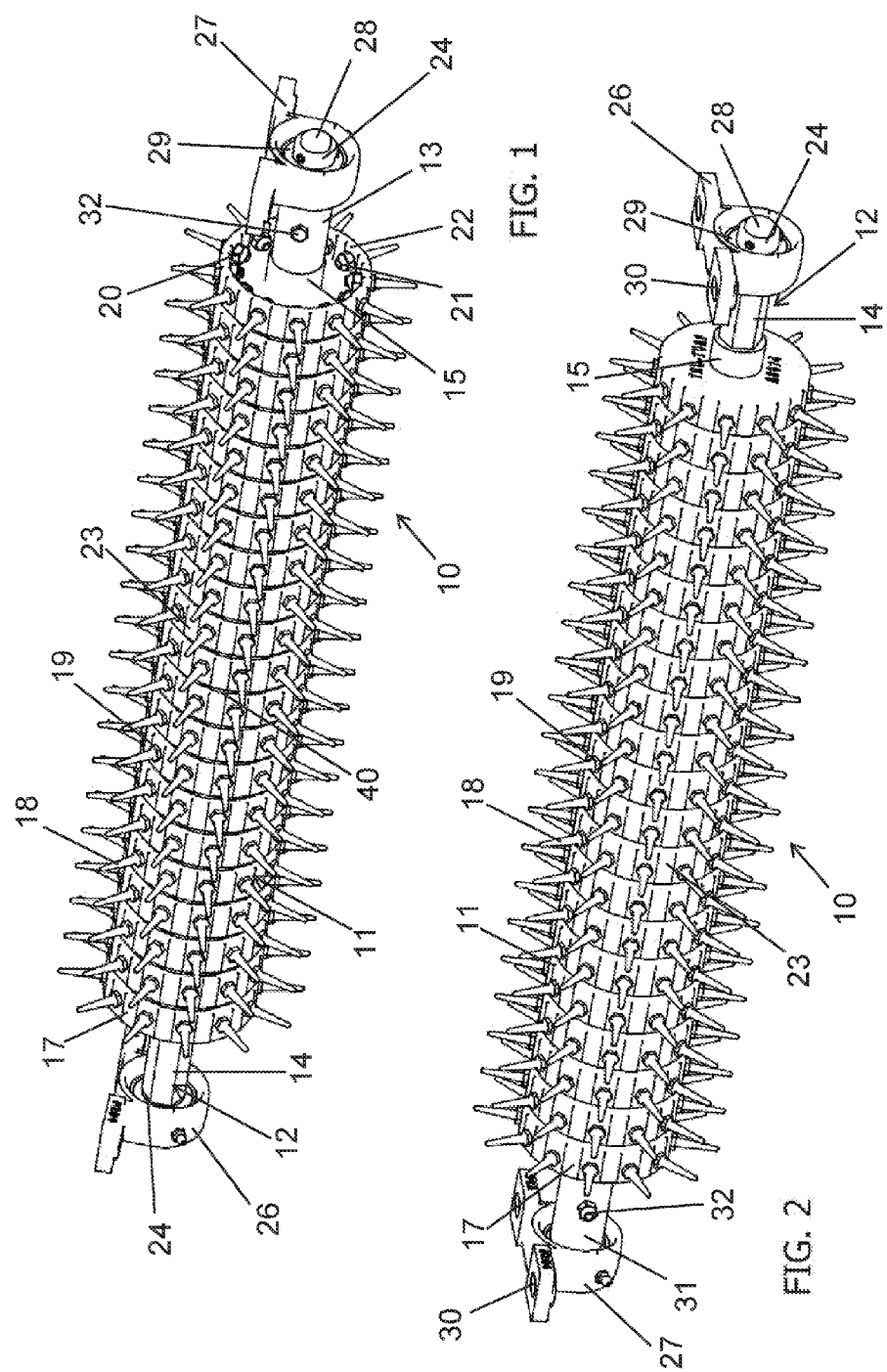

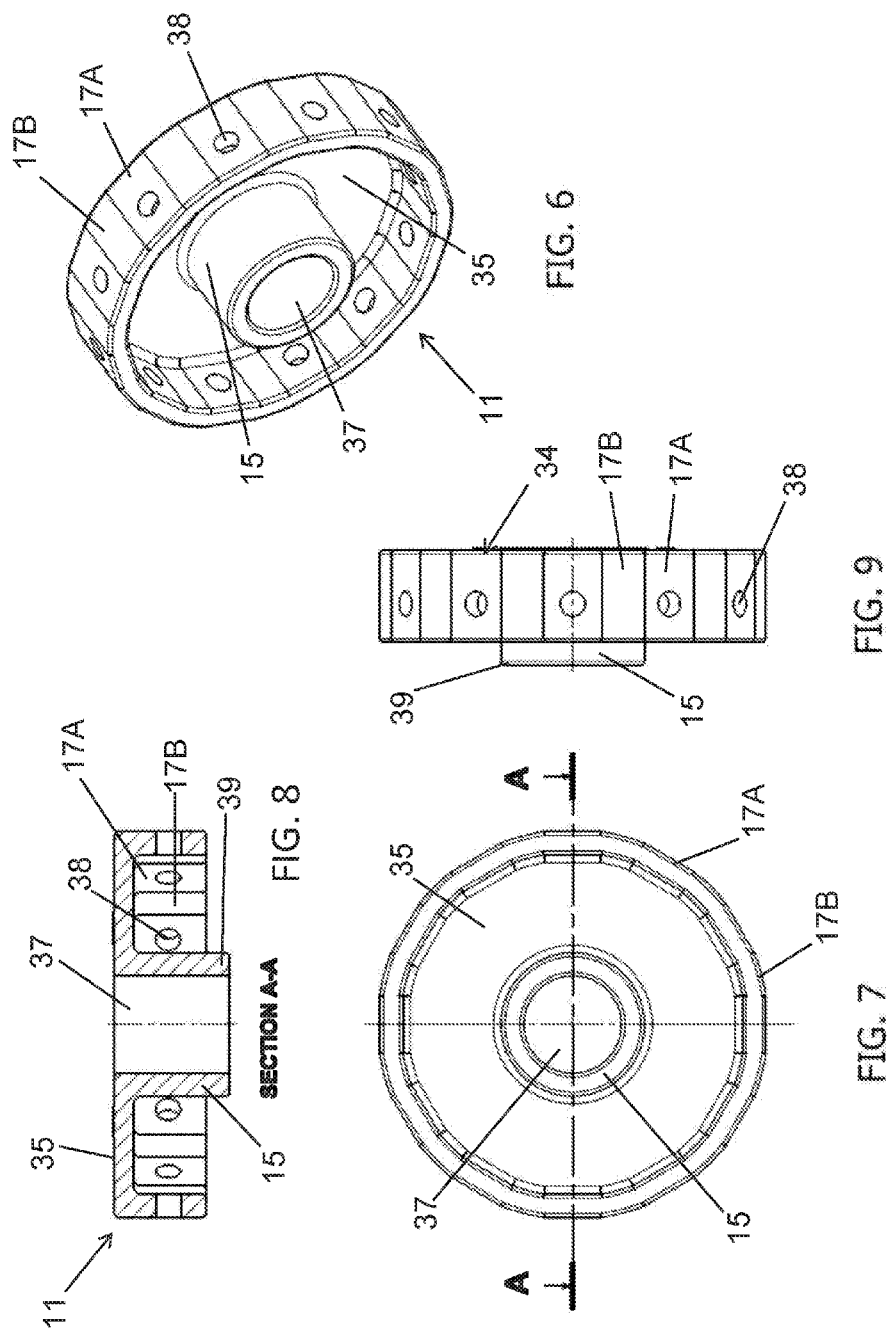

SPIKER ROLLER

FIELD OF THE INVENTION

This invention relates to a spiker roller which may be used for aerating turf or grass especially on golfing greens or fairways.

BACKGROUND OF THE INVENTION

It is conventional on golfing greens and fairways to aerate the grass or turf and this is extremely important because aeration relieves soil compaction, it provides a method to improve the soil mixture around the highest part of a green's roots, and it reduces or prevents the accumulation of excess thatch. In this regard it will be appreciated grass, in order to stay healthy, must have deep healthy roots which demand oxygen and the oxygen supply comes from tiny pockets of air trapped between soil and sand particles. It is necessary to maintain those tiny pockets of air because over a period of time compaction of the soil due to golfer's feet and turf rollers will cause compaction of the soil which is undesirable. That is why constant aeration or the formation of holes in the grass surface is essential.

Conventional spiker rollers include manually propelled rollers having tapped or screw threaded holes into which spikes are inserted and retained therein by a nylock nut. Such spiker rollers are marketed under SAREL spiker rollers and available at www.gardeningtools-direct.co.uk. However one of the major problems with conventional spiker rollers is that upon turning or undergoing a pivotal motion they tend to tear or damage the turf. Another problem is that the steel spikes become separated from their mating tapped or screw threaded holes or sockets in the roller and thus are deposited onto the grass surface where they may become entangled with cutting heads or reels of lawn mowers.

Conventional spiker rollers are also described in U.S. Pat. No. 5,975,441 which refers to a spiker roller assembly having a mounting shaft and a plurality of transversely fixed mounting collars on which spike member quadrants may be attached. This may occur by the mounting collars having a threaded opening to accommodate a respective spiked quadrant. In this arrangement each spike is integral with an individual quadrant.

GB 605974 describes a spiker roller assembly which includes a plurality of discs each furnished with a multiplicity of spikes which are rotatably mounted on a hub of a shaft secured in opposed side members. There is also provided rollers which have T shaped ends and which are driven simultaneously with the discs by a sprocket drive.

GB 127808 describes a spiker roller having discs rotatably mounted on a shaft wherein each disc has in their inner end surfaces recesses for retaining flat bars whose outer ends form spikes extending outwardly from the spiker roller. Teeth on the inner ends of the bars engage with ribs or teeth on the bars. The discs are held together by a rod and the discs are locked to the shaft. The amount of projection of the spikes is varied by withdrawing a spring biased pin and rotating the discs about the shaft after which the pin is engaged with the teeth.

U.S. Pat. No. 1,965,510 refers to a spiker roller having spike mountings each in the form of a sleeve having a boss for detachably retaining an adjacent spike. The spike mountings are pivotally supported on an adjacent rod and can be readily replaced when required. Upon the travel of the roller the pivotal movement of the spikes enables them to be readily extracted from the ground upon continued movement of the roller.

US Patent Publication 2006/0180324 refers to a plurality of spike wheels attached to a harrow wherein each wheel has a plurality of spikes that project outwardly from a cylindrical hub having a pair of opposite ends. Projections at one end of the hub are matingly received within notches in the opposite end of the hub of the next adjacent wheel so that the wheels are interlocked for rotation in unison.

In summary of the patent references described above it will be appreciated that each of the spiker rollers or wheels are extremely complex in structure and thus would be extremely expensive to manufacture. It also seems that they would be ineffective in operation in preventing tearing or damage to the ground upon pivotal movement.

OBJECT OF THE INVENTION

It is therefore an object of the invention to provide a spiker roller which is effective in use and which reduces damage to the ground upon pivotal movement.

SUMMARY OF THE INVENTION

The spiker roller of the invention therefore includes:
(i) a roller assembly having a plurality of roller components each having a peripheral wall and a plurality of apertures in each wall and a centrally located hub or boss surrounding an opening;
(ii) a multiplicity of spikes which are each releasably retained within a respective aperture of each roller component; and
(iii) a support shaft which is insertable through each of the openings of each roller component wherein in operation each of the roller components rotate independently of each other.

Each of the roller components in addition to the peripheral wall which surrounds the hub or boss may also have a single end wall which also surrounds the hub or boss.

The hub or boss may also have an outer part that extends outwardly from the peripheral wall in side view as shown in the drawings. This has the advantages of providing greater support for each roller component on the support shaft and also makes assembly or attachment of each roller component to the support shaft much easier.

Each spike suitably has an outwardly extending pointed part and a nut preferably integral with the spike which is intermediate to a pointed part and a screw threaded part. This makes the attachment of each spike to each aperture a secure arrangement because of provision of an inner nut which engages the screw threaded part and which abuts an inner surface of the peripheral wall and the intermediate nut which abuts an outer surface of the peripheral wall.

DESCRIPTION OF THE PREFERRED EMBODIMENT OF THE INVENTION

Reference may now be made to a preferred embodiment of the invention as shown in the attached drawings wherein:

FIG. 1 is a perspective view of a spiker roller of the invention from one end;

FIG. 2 is a perspective view of the spiker roller from the opposite end;

FIG. 6 is a perspective view of the roller component shown in FIG. 3 or FIG. 5;

FIG. 7 is a plan view of the roller component shown in FIGS. 3, 5 and 6;

FIG. 8 is a section along lines A-A shown in FIG. 7;

FIG. 9 is a side view of the roller component shown in FIG. 7; and

Figure 4:
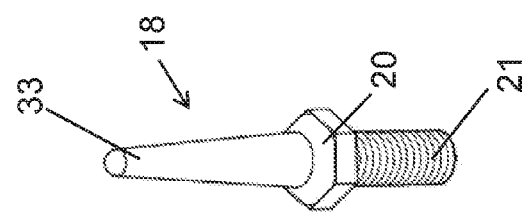
FIG. 4 is a perspective view of one of the spikes used in the roller component shown in FIG. 3.

In FIGS. 1-2 there is shown spiker roller having a roller assembly 10 which has a plurality of roller components 11 mounted to an axle or shaft 12 which may be round or of circular cross section as shown at 13 or of hexagonal cross section as shown at 14. There is also shown a hub 15 of each roller component 11 which are all independently rotatable on shaft 12. Each roller component 11 has a plurality of flats 17 and a multiplicity of spikes 18 which are each releasably attached to an adjacent roller component 11 by outer nuts 19 which are an integral part of each spike 18 as shown in FIG. 4. There are also provided inner nuts 20 in FIG. 1 which are releasably attached to a screw threaded part 21 of each spike 18 which is shown in FIG. 4. Each of nuts 19 and 20 abut an inner surface 22 and outer surface 23 of each flat 17.

The hexagonal shaft 14 may be welded to an adjacent bush 24 or be attached to bush 24 by a suitable fastener (not shown). There are also shown a pair of bearing blocks 26 and 27 and shaft 12 has a reduced end portion or stub axle 28 at each end which extends through bush 24. There are also shown bearings 29 in each bearing block 26 and 27. Each bearing block 26 and 27 has attachment apertures 30 for attachment to an adjacent support frame or chassis (not shown) of a roller apparatus. There is also provided a spacer sleeve 31 which surrounds a round shaft 13 and attached thereto by fasteners 32.

Figure 3:
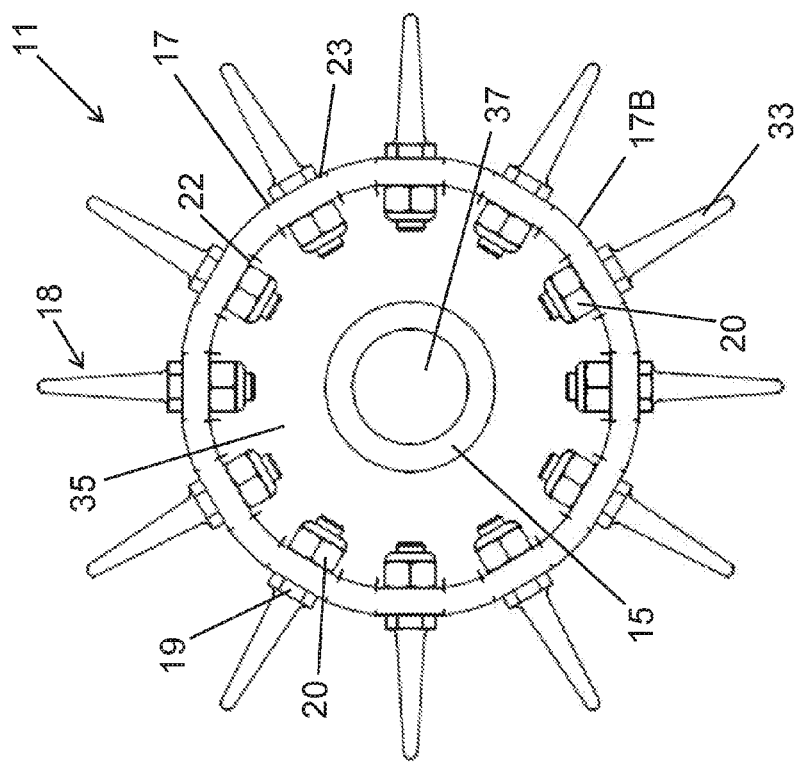
FIG. 3 is an end view of one of the roller components used in the spiker roller of FIG. 1 or FIG. 2.

FIG. 3 shows a side view of roller component 11 showing how each spike 18 is attached to alternate flats 17 of roller component 16. The purpose of flats 17 is to ensure that nuts 19 and 20 are securely retained on a flat or planar surface 22 and 23. There is also provided a single end wall 35 surrounding hub 15 and shaft aperture 37.

FIG. 4 shows a perspective view of an individual spike 18 and includes an inwardly tapered outer portion 33, intermediate nut or nut part 20 integral with spike 18 and inner threaded part 21.

Figure 5:
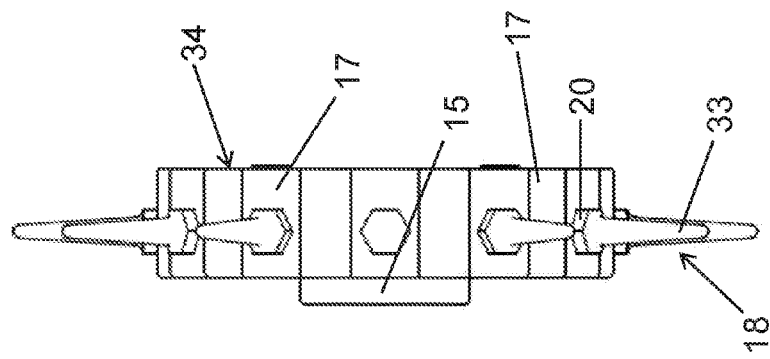
FIG. 5 is a side view of the roller component shown in FIG. 3.

FIG. 5 shows that each roller component has a peripheral wall 34 which is made up of adjacent flat portions or flats 17.

In FIG. 6 there is shown a perspective view of an individual roller component 11 showing end wall 35 and hub 15 as well as apertures 38 for receiving spikes 18.

In FIG. 7 there is shown a plan view of roller component 11 peripheral wall 34 having flats 17A which incorporate apertures 38 of each spike 18 and adjacent non-apertured flats 17B which also have a planar inner surface and outer surface.

FIGS. 8-9 show that hub 15 extends outwardly from peripheral wall 34 of each roller component 11 so that when each roller component 11 is located on shaft 12 shown in FIGS. 1-2 the outwardly extending part 39 of hub or boss 15 functions as a spacer to space each adjacent roller bearing 11 from each other so that each individual roller bearing 11 when attached to shaft 12 may rotate independently of each other so that golfing greens may be very quickly and efficiently aerated by the formation of a multitude of holes in the top surface of the golfing green as shown in FIGS. 1-2. There are provided gaps or spaces 40 in FIG. 10 between adjacent roller components 11 which are created by outwardly extending parts 39 of each hub or boss 15. This substantially reduces friction compared to the case of conventional spiker rollers wherein each spike is releasably attached to a tapped hole or socket in the roller.

Figure 10:
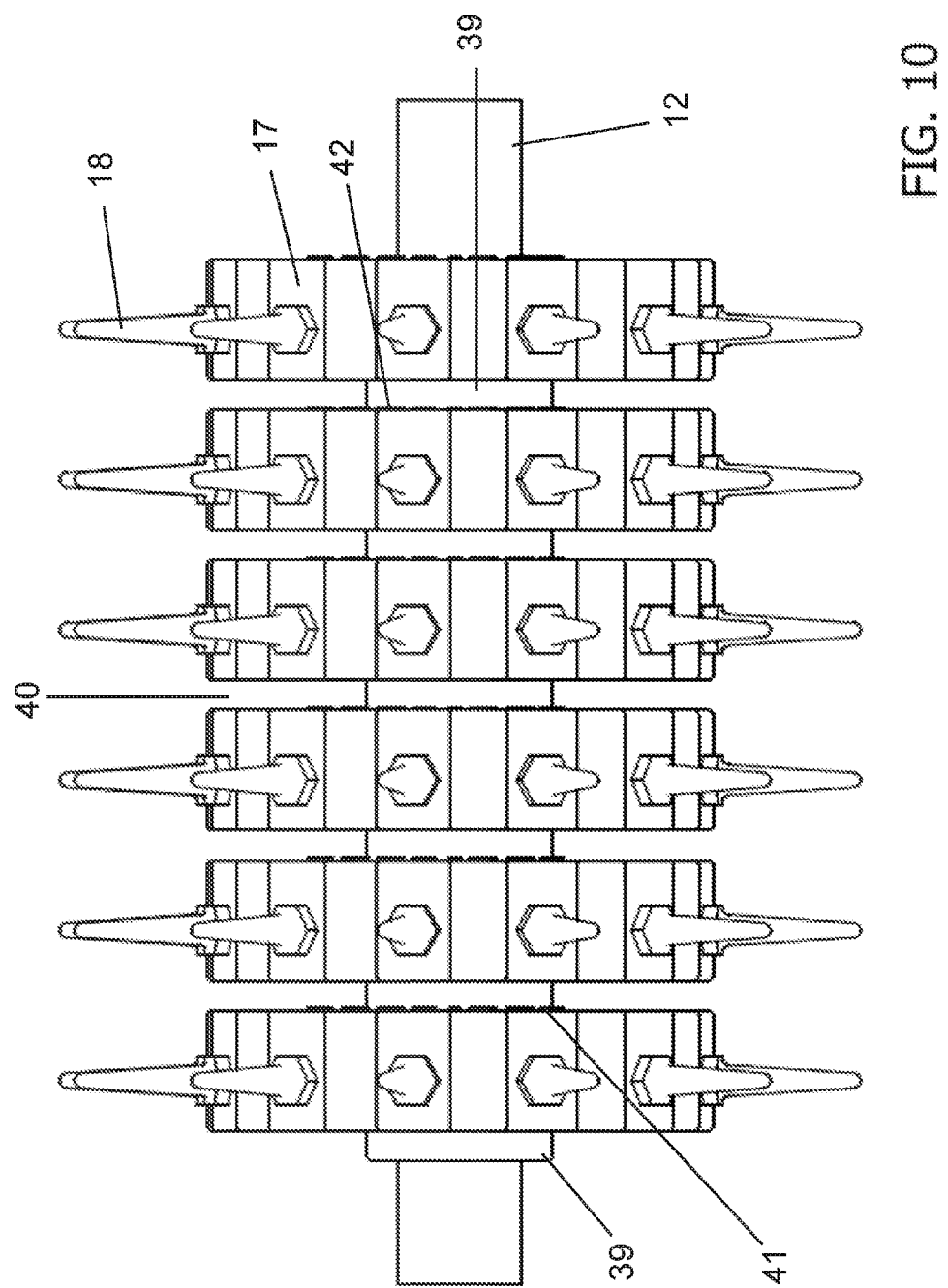
FIG. 10 is a side view of part of the spiker roller shown in FIGS. 1-2.

FIG. 10 also shows that each roller component 11 rotates independently of each other by virtue of gaps or spaces 40 between each roller component 11. The presence of outwardly extending part 39 greatly reduces friction as the only thrust bearing surfaces occur between outer surface 41 of each outwardly extending part 39 and adjacent surface 42 of each roller component 11.

Another advantage of the spiker roller of the invention is that it substantially reduces tearing or damage to the turf which often occurs in relation to a conventional spiker roller as described above when the conventional spiker roller makes a turning motion. This does not occur with the spiker roller of the invention because each roller component 11 is independently rotatable on axle 12. It will also be appreciated that each spike 18 may be varied as appropriate as each aperture 38 can retain spikes 18 of different sizes or diameters. A problem of the conventional spiker roller also was that often the spikes became loose and thus became separated from the conventional spiker roller and often the loose spikes caused damage to lawn mowers wherein the spikes became entangled with the cutting reels or heads of the mower. This is avoided in the present invention because each spike 18 is securely attached to each roller component 11 by inner and outer nuts 19 and 20. This secure attachment is also facilitated by flats 17 as described above.

Each roller component 11 may have peripheral wall 34 integral with the hub 15 and outer part or spacer 39.

The invention also includes within its scope roller component 11 per se.

The invention claimed is:

1. A spiker roller having:
   (i) a roller assembly having a plurality of roller components each having a peripheral wall and a plurality of apertures in the peripheral wall and an end wall which has a centrally located hub or boss surrounding an opening, wherein said hub or boss has an end portion remote from the end wall which extends outwardly from the peripheral wall to define a spacer;
   (ii) a multiplicity of spikes which are each releasably retained within a respective aperture of each roller component; and
   (iii) a support shaft which is insertable through the opening in each roller component, wherein each of the roller components when mounted on the support shaft is separated by said spacer being configured to engage with the end wall of one roller component adjacent thereto so that each roller component can rotate independently of each other;
   wherein the peripheral wall has a plurality of flats each incorporating a respective aperture and each apertured flat has a planar inner surface and a planar outer surface through which aperture a respective spike extends.

2. The spiker roller as claimed in claim 1 wherein the centrally located hub or boss of each roller component is also surrounded by a hollow interior of each roller component which is defined by the peripheral wall.

3. The spiker roller as claimed in claim 1 wherein each spike has an outwardly extending pointed part and a screw threaded part.

4. The spiker roller as claimed in claim 3 wherein an inner nut engages with the screw threaded part adjacent an inner surface of the peripheral wall of each roller component and an outer nut engages with the outwardly extending pointed part adjacent an outer surface of the peripheral wall.

5. The spiker roller as claimed in claim 4 wherein there is also provided a multiplicity of non-apertured flats each having a planar inner surface and a planar outer surface, wherein each non-apertured flat is bounded by a respective pair of apertured flats.

6. The spiker roller as claimed in claim 1 wherein there are also provided thrust or bearing surfaces on an outer surface of each spacer and an opposed outer surface of each end wall.

7. A roller component for a spiker roller having a peripheral wall and a plurality of apertures in the peripheral wall and an end wall which has a centrally located hub or boss surrounding an opening, wherein said hub or boss has an outer end portion remote from the end wall which extends outwardly from the peripheral wall to define a spacer whereby in use an adjacent roller component is separated by said spacer being configured to engage an end wall of the adjacent roller component so that said adjacent roller component can rotate independently of the roller component and wherein the peripheral wall has a plurality of flats each incorporating a respective aperture and each apertured flat has a planar inner surface and a planar outer surface through which aperture a respective spike extends.

* * * * *